(12) United States Patent
Lin et al.

(10) Patent No.: US 10,397,931 B2
(45) Date of Patent: Aug. 27, 2019

(54) METHOD AND APPARATUS FOR REPORTING TERMINAL DEVICE CAPABILITY

(71) Applicant: Huawei Technologies Co., Ltd., Shenzhen (CN)

(72) Inventors: Bo Lin, Beijing (CN); Jian Wang, Beijing (CN); Jie Ma, Beijing (CN); Zhenzhen Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 15/426,377

(22) Filed: Feb. 7, 2017

(65) Prior Publication Data
US 2017/0150491 A1    May 25, 2017

Related U.S. Application Data

(63) Continuation of application No. PCT/CN2014/084017, filed on Aug. 8, 2014.

(51) Int. Cl.
*H04W 72/04* (2009.01)
*H04W 76/14* (2018.01)
(Continued)

(52) U.S. Cl.
CPC .......... *H04W 72/048* (2013.01); *H04W 8/22* (2013.01); *H04W 24/10* (2013.01); *H04W 76/14* (2018.02)

(58) Field of Classification Search
CPC ... H04W 76/14; H04W 72/048; H04W 72/04; H04W 8/22; H04W 24/10; H04W 76/02
(Continued)

(56) References Cited

U.S. PATENT DOCUMENTS 8,504,052 B2 * 8/2013 Hakola ................. H04W 24/10
                                                    455/452.1
8,885,507 B2 * 11/2014 Chen ................. H04W 72/0406
                                                    370/252
(Continued)

FOREIGN PATENT DOCUMENTS

CN    102291711 A    12/2011
CN    103209403 A    7/2013
(Continued)

OTHER PUBLICATIONS

Foreign Communication From A Counterpart Application, Japanese Application No. 2017-506859, Japanese Office Action dated Apr. 17, 2018, 3 pages.
(Continued)

*Primary Examiner* — Man U Phan
(74) *Attorney, Agent, or Firm* — Conley Rose, P.C.

(57) ABSTRACT

A method and an apparatus for reporting a terminal device capability is presented. An apparatus for reporting a terminal device capability includes: a processor configured to obtain D2D capability information of a terminal device; and a transmitter configured to send the D2D capability information of the terminal device to a base station. In the method and the apparatus for reporting a terminal device capability that are provided in the embodiments of the present disclosure, a terminal device reports D2D capability information to a base station, so that the base station can correctly schedule a resource for D2D communication of the terminal device.

8 Claims, 2 Drawing Sheets

(51) Int. Cl.
*H04W 8/22* (2009.01)
*H04W 24/10* (2009.01)

(58) Field of Classification Search
USPC .................................................. 370/329, 252
See application file for complete search history.

(56) References Cited

U.S. PATENT DOCUMENTS

| | | | |
|---|---|---|---|
| 9,420,564 B2* | 8/2016 | Charbit | H04W 72/04 |
| 9,763,274 B2* | 9/2017 | Li | H04W 8/005 |
| 9,854,044 B2* | 12/2017 | Kazmi | H04W 28/18 |
| 9,888,519 B2* | 2/2018 | Agiwal | H04W 76/14 |
| 9,986,423 B2* | 5/2018 | Siomina | H04W 76/14 |
| 10,009,900 B2* | 6/2018 | Lindoff | H04W 72/1257 |
| 10,028,204 B2* | 7/2018 | Blankenship | H04L 67/303 |
| 10,178,689 B2* | 1/2019 | Yilmaz | H04W 72/1263 |
| 2006/0160544 A1 | 7/2006 | Sun et al. | |
| 2010/0304759 A1 | 12/2010 | Leppanen et al. | |
| 2011/0275382 A1 | 11/2011 | Hakola | |
| 2012/0133428 A1 | 5/2012 | Forbes et al. | |
| 2013/0288668 A1 | 10/2013 | Pragada et al. | |
| 2014/0029570 A1 | 1/2014 | Lee et al. | |
| 2014/0057667 A1 | 2/2014 | Blankenship et al. | |
| 2014/0092761 A1 | 4/2014 | Behravan et al. | |
| 2014/0219170 A1 | 8/2014 | Zhao et al. | |
| 2015/0173029 A1 | 6/2015 | Fujishiro et al. | |
| 2017/0013657 A1 | 1/2017 | Jung et al. | |

FOREIGN PATENT DOCUMENTS

| | | |
|---|---|---|
| CN | 103379654 A | 10/2013 |
| CN | 103686691 A | 3/2014 |
| CN | 103686976 A | 3/2014 |
| EP | 2866369 A1 | 7/2013 |
| JP | 2017513392 A | 5/2017 |
| RU | 2515547 C2 | 5/2014 |
| WO | 2011069295 A1 | 6/2011 |
| WO | 2013048296 A1 | 4/2013 |
| WO | 2013138814 A1 | 9/2013 |
| WO | 2014008073 A1 | 1/2014 |
| WO | 2014019510 A1 | 2/2014 |
| WO | 2014034573 A1 | 3/2014 |
| WO | 2014071555 A1 | 5/2014 |
| WO | 2015147618 A1 | 10/2015 |

OTHER PUBLICATIONS

Foreign Communication From A Counterpart Application, Japanese Application No. 2017-506859, English Translation of Japanese Office Action dated Apr. 17, 2018, 4 pages.
"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, Technical Specification, V12.2.0, Jun. 2014, 365 pages.
Machine Translation and Abstract of Chinese Publication No. CN103379654, Oct. 30, 2013, 16 pages.
Foreign Communication From A Counterpart Application, PCT Application No. 14899491.6, Extended European Search Report dated Jun. 14, 2017, 8 pages.
Foreign Communication From a Counterpart Application, PCT Application No. PCT/CN2014/084017, English Translation of International Search Report dated May 12, 2015, 2 pages.
Foreign Communication From A Counterpart Application, PCT Application No. PCT/CN2014/084017, English Translation of Written Opinion dated May 12, 2015, 6 pages.
"D2D capability for multi-carrier capable UE," 3GPP TSG-RAN WG2 #86, R2-142634, May 19-23, 2014, 3 pages.
Foreign Communication From A Counterpart Application, Korean Application No. 10-2017-7003383, Korean Office Action dated Oct. 20, 2017, 5 pages.
Foreign Communication From A Counterpart Application, Korean Application No. 10-2017-7003383, English Translation of Korean Office Action dated Oct. 20, 2017, 3 pages.
Foreign Communication From A Counterpart Application, European Application No. 14899491.6, European Office Action dated Mar. 15, 2019, 4 pages.
Machine Translation and Abstract of Chinese Publication No. CN103209403, Jul. 17, 2013, 19 pages.
Foreign Communication From A Counterpart Application, Russian Application No. 2017107212, Russian Office Action dated Apr. 11, 2018, 5 pages.
Foreign Communication From A Counterpart Application, Russian Application No. 2017107212, Russian Search Report dated Mar. 29, 2018, 2 pages.
Foreign Communication From A Counterpart Application, Chinese Application No. 201480021661.0, Chinese Office Action dated May 2, 2018, 8 pages.

* cited by examiner

METHOD AND APPARATUS FOR REPORTING TERMINAL DEVICE CAPABILITY

CROSS-REFERENCE TO RELATED APPLICATIONS

This application is a continuation of International Application No. PCT/CN2014/084017, filed on Aug. 8, 2014, the disclosure of which is hereby incorporated by reference in its entirety.

TECHNICAL FIELD

Embodiments of the present disclosure relate to the field of wireless communications technologies, and in particular, to a method and an apparatus for reporting a terminal device capability.

BACKGROUND

Device to device (D2D) communication is a technology for direct communication between terminal devices. A difference between the D2D communication and a cellular communications technology lies in that data sent by a terminal device during D2D communication does not need to be transmitted by a base station but is directly transmitted using an air interface between terminals.

A terminal device that performs D2D communication may be referred to as a D2D device. A D2D device not only can perform communication in a cellular communications network, but also can perform D2D communication, and a resource used by the D2D device to perform D2D communication is managed by a base station in a cellular network. D2D communication includes multiple features, and as wireless communications technologies evolve, D2D features that can be supported by terminal devices also gradually evolve. That is, different D2D devices may support different D2D features, and a D2D feature that can be supported by a base station may be different from a feature that can be supported by a D2D device. Because a base station needs to schedule a corresponding resource for a D2D device according to a D2D feature that can be supported by the D2D device, to perform D2D communication, the base station may schedule an unnecessary resource for a D2D feature that is not supported by the D2D device, or cannot schedule a corresponding resource for a resource supported by a D2D feature.

In conclusion, how to enable a base station to correctly schedule a resource for a D2D device in D2D communication is a problem that urgently needs to be resolved in the art.

SUMMARY

Embodiments of the present disclosure provide a method and an apparatus for reporting a terminal device capability, where a terminal device reports D2D capability information to a base station, so that the base station can correctly schedule a resource for D2D communication of the terminal device.

According to a first aspect, an apparatus for reporting a terminal device capability is provided, including a processing module configured to obtain D2D capability information of a terminal device; and a sending module configured to send the D2D capability information of the terminal device to a base station.

With reference to the first aspect, in a first possible implementation manner of the first aspect, the D2D capability information of the terminal device includes at least one piece of D2D radio frequency capability information of the terminal device and D2D feature supporting information of the terminal device.

With reference to the first possible implementation manner of the first aspect, in a second possible implementation manner of the first aspect, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

With reference to any possible implementation manner of the first aspect to the second possible implementation manner of the first aspect, in a third possible implementation manner of the first aspect, the apparatus further includes a receiving module configured to, before the sending module sends the D2D capability information of the terminal device to the base station, receive a terminal capability query message sent by the base station.

With reference to the third possible implementation manner of the first aspect, in a fourth possible implementation manner of the first aspect, the terminal capability query message includes D2D capability reporting request information, and the D2D capability reporting request information is used to instruct the terminal device to report corresponding D2D capability information; and the sending module is configured to send, to the base station according to the D2D capability reporting request information, the D2D capability information corresponding to the D2D capability reporting request information.

With reference to any possible implementation manner of the first aspect to the second possible implementation manner of the first aspect, in a fifth possible implementation manner of the first aspect, the sending module is configured to periodically send the D2D capability information of the terminal device to the base station.

With reference to any possible implementation manner of the first aspect to the second possible implementation manner of the first aspect, in a sixth possible implementation manner of the first aspect, the sending module is configured to send a registration request message to the base station, where the registration request message includes the D2D capability information of the terminal device, or send the D2D capability information of the terminal device to the base station after the receiving module receives a registration acknowledgement message sent by the base station.

According to a second aspect, an apparatus for reporting a terminal device capability is provided, including a receiving module configured to receive D2D capability information of a terminal device that is sent by the terminal device; and a processing module configured to determine a D2D capability of the terminal device according to the D2D capability information of the terminal device.

With reference to the second aspect, in a first possible implementation manner of the second aspect, the D2D capability information of the terminal device includes at least one piece of D2D radio frequency capability information of the terminal device and D2D feature supporting information of the terminal device.

With reference to the first possible implementation manner of the second aspect, in a second possible implementation manner of the second aspect, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

With reference to any possible implementation manner of the second aspect to the second possible implementation manner of the second aspect, in a third possible implementation manner of the second aspect, the apparatus further includes a sending module configured to, before the receiving module receives the D2D capability information of the terminal device that is sent by the terminal device, send a terminal capability query message to the terminal device.

With reference to the third possible implementation manner of the second aspect, in a fourth possible implementation manner of the second aspect, the terminal capability query message includes D2D capability reporting request information, and the D2D capability reporting request information is used to instruct the terminal device to report corresponding D2D capability information; and the receiving module is configured to receive the D2D capability information that is sent by the terminal device according to the D2D capability reporting request information, and corresponds to the D2D capability reporting request information.

With reference to any possible implementation manner of the second aspect to the second possible implementation manner of the second aspect, in a fifth possible implementation manner of the second aspect, the receiving module is configured to receive the D2D capability information of the terminal device that is periodically sent by the terminal device.

With reference to any possible implementation manner of the second aspect to the second possible implementation manner of the second aspect, in a sixth possible implementation manner of the second aspect, the receiving module is configured to receive a registration request message sent by the terminal device, where the registration request message includes the D2D capability information of the terminal device, or receive the D2D capability information of the terminal device that is sent by the terminal device after the terminal device receives a registration acknowledgement message.

According to a third aspect, a method for reporting a terminal device capability is provided, including obtaining, by a terminal device, D2D capability information of the terminal device; and sending, by the terminal device, the D2D capability information of the terminal device to a base station.

With reference to the third aspect, in a first possible implementation manner of the third aspect, the D2D capability information of the terminal device includes at least one piece of D2D radio frequency capability information of the terminal device and D2D feature supporting information of the terminal device.

With reference to the first possible implementation manner of the third aspect, in a second possible implementation manner of the third aspect, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

With reference to any possible implementation manner of the third aspect to the second possible implementation manner of the third aspect, in a third possible implementation manner of the third aspect, before the sending, by the terminal device, the D2D capability information of the terminal device to the base station, the method further includes receiving, by the terminal device, a terminal capability query message sent by the base station.

With reference to the third possible implementation manner of the third aspect, in a fourth possible implementation manner of the third aspect, the terminal capability query message includes D2D capability reporting request information, and the D2D capability reporting request information is used to instruct the terminal device to report corresponding D2D capability information; and the sending, by the terminal device, the D2D capability information of the terminal device to the base station includes sending, by the terminal device to the base station according to the D2D capability reporting request information, the D2D capability information corresponding to the D2D capability reporting request information.

With reference to any possible implementation manner of the third aspect to the second possible implementation manner of the third aspect, in a fifth possible implementation manner of the third aspect, the sending, by the terminal device, the D2D capability information of the terminal device to the base station includes periodically sending, by the terminal device, the D2D capability information of the terminal device to the base station.

With reference to any possible implementation manner of the third aspect to the second possible implementation manner of the third aspect, in a sixth possible implementation manner of the third aspect, the sending, by the terminal device, the device to device D2D capability information of the terminal device to the base station includes sending, by the terminal device, a registration request message to the base station, where the registration request message includes the D2D capability information of the terminal device; or sending, by the terminal device, the D2D capability information of the terminal device to the base station after the terminal device receives a registration acknowledgement message sent by the base station.

According to a fourth aspect, a method for reporting a terminal device capability is provided, including receiving, by a base station, D2D capability information of a terminal device that is sent by the terminal device; and determining, by the base station, a D2D capability of the terminal device according to the D2D capability information of the terminal device.

With reference to the fourth aspect, in a first possible implementation manner of the fourth aspect, the D2D capability information of the terminal device includes at least one piece of D2D radio frequency capability information of the terminal device and D2D feature supporting information of the terminal device.

With reference to the first possible implementation manner of the fourth aspect, in a second possible implementation manner of the fourth aspect, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

With reference to any possible implementation manner of the fourth aspect to the second possible implementation manner of the fourth aspect, in a third possible implementation manner of the fourth aspect, before the receiving, by a base station, D2D capability information of a terminal device that is sent by the terminal device, the method further includes sending, by the base station, a terminal capability query message to the terminal device.

With reference to the third possible implementation manner of the fourth aspect, in a fourth possible implementation manner of the fourth aspect, the terminal capability query message includes D2D capability reporting request information, and the D2D capability reporting request information is used to instruct the terminal device to report corresponding D2D capability information; and the receiving, by a base station, D2D capability information of a terminal device that is sent by the terminal device includes receiving, by the base station, the D2D capability information that is sent by the terminal device according to the D2D capability reporting request information, and corresponds to the D2D capability reporting request information.

With reference to any possible implementation manner of the fourth aspect to the second possible implementation manner of the fourth aspect, in a fifth possible implementation manner of the fourth aspect, the receiving, by a base station, D2D capability information of a terminal device that is sent by the terminal device includes receiving, by the base station, the D2D capability information of the terminal device that is periodically sent by the terminal device.

With reference to any possible implementation manner of the fourth aspect to the second possible implementation manner of the fourth aspect, in a sixth possible implementation manner of the fourth aspect, the receiving, by a base station, D2D capability information of a terminal device that is sent by the terminal device includes receiving, by the base station, a registration request message sent by the terminal device, where the registration request message includes the D2D capability information of the terminal device; or receiving, by the base station, the D2D capability information of the terminal device that is sent by the terminal device after the terminal device receives a registration acknowledgement message.

In the method and the apparatus for reporting a terminal device capability that are provided in the embodiments of the present disclosure, D2D capability information of a terminal device is obtained, and the D2D capability information of the terminal device is reported to a base station, so that the base station can know a D2D capability supported by the terminal device, and correctly allocate a resource for D2D communication of the terminal device.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In a process in which a Long Term Evolution (LTE) system evolves, there are multiple system versions such as Release 8, Release 10, and Release 12. As a version is improved, a base station and a terminal device can support more features, and a new version is compatible with an old version. When a system version is upgraded, it is rather difficult to simultaneously upgrade or replace all base stations and terminal devices on a network. Therefore, systems of multiple versions unavoidably coexist on the network.

For D2D communication, all resources used by a terminal device to perform D2D communication are scheduled by a base station. If a system version of the base station is higher than a system version of the terminal device, the base station may allocate an unnecessary resource to a feature that is not supported by the terminal device. If a system version of the base station is lower than a system version of the terminal device, the base station may not allocate resources to some features of the terminal device.

Figure 1:
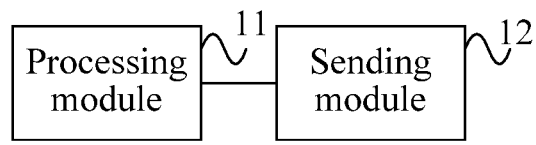
FIG. 1 is a schematic structural diagram of Embodiment 1 of an apparatus for reporting a terminal device capability according to an embodiment of the present disclosure.

FIG. 1 is a schematic structural diagram of Embodiment 1 of an apparatus for reporting a terminal device capability according to an embodiment of the present disclosure. As shown in FIG. 1, the apparatus for reporting a terminal device capability in this embodiment includes a processing module 11 configured to obtain D2D capability information of a terminal device; and The apparatus for reporting a terminal device capability that is provided in this embodiment is disposed in a terminal device that can perform D2D communication.

To enable a base station to correctly schedule a resource for D2D communication of a D2D device, the processing module 11 in the apparatus for reporting a terminal device capability that is provided in this embodiment first obtains the D2D capability information of the terminal device. The D2D capability information of the terminal device indicates various capabilities of performing D2D communication by the terminal device.

The D2D capability information of the terminal device includes, for example, at least one piece of D2D radio frequency capability information of the terminal device and D2D feature supporting information of the terminal device. The D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation. The D2D feature supporting information of the terminal device includes a D2D feature supported by the terminal device.

That is, the D2D capability information of the terminal device includes information of two aspects: one aspect is a D2D radio frequency capability, and the other aspect is a D2D supported-feature capability. D2D communication works over an uplink frequency band of a spectrum of a cellular network, a cell, in which the terminal device is located, of the cellular network may support multiple uplink frequency bands, and the terminal device may support D2D communication over only some uplink frequency bands. Therefore, the D2D radio frequency capability includes the information about a radio frequency band over which the terminal device supports D2D communication. In addition, the terminal device may support both D2D communication and cellular communication, and the terminal device supports both D2D communication and cellular communication over some frequency bands. Therefore, the D2D radio frequency capability includes the information about a radio frequency band over which the terminal device supports both D2D communication and cellular communication. Moreover, the terminal device may further support carrier aggregation (CA). When the terminal device supports CA, the terminal device may use multiple downlink carriers to simultaneously receive data, and in this case, the terminal device may support D2D communication over one uplink carrier. Therefore, the D2D radio frequency capability includes the capability information that the terminal device supports both D2D communication and carrier aggregation. The D2D supported-capability information includes, for example, a D2D discovery capability, a D2D broadcast communication capability, a D2D point-to-point transmission capability, a D2D multicast communication capability, and a D2D relay communication capability.

The D2D capability information of the terminal device is determined by hardware and software configurations of the terminal device, that is, the D2D capability information is an inherent attribute of the terminal device, and the D2D capability information of the terminal device changes only after hardware or software of the terminal device is upgraded. Therefore, the processing module 11 may obtain the D2D capability information from preset information of the terminal device, or the processing module 11 may obtain the D2D capability information according to a hardware or software configuration of the terminal device.

A sending module 12 configured to send the D2D capability information of the terminal device to a base station.

After the processing module 11 obtains the D2D capability information of the terminal device, the sending module 12 sends the D2D capability information of the terminal device to the base station, so that the base station obtains the D2D capability information of the terminal device. In this way, the base station can know, according to the D2D capability information of the terminal device, a D2D capability supported by the terminal device, and further allocate a corresponding resource to the terminal device to complete D2D communication.

The sending module 12 may periodically send the D2D capability information of the terminal device to the base station, or the sending module 12 may send the D2D capability information of the terminal device to the base station after the apparatus for reporting a terminal device capability receives a terminal capability query message sent by the base station.

The D2D capability information sent by the sending module 12 to the base station may be specific capability information, for example, the D2D discovery capability is supported, or the D2D broadcast communication capability is supported; or the sending module 12 may send a system version number of the terminal device to the base station. D2D capabilities supported by different system versions are fixed. Therefore, after knowing the system version of the terminal device, the base station can know the D2D capability information of the terminal device.

In this embodiment, D2D capability information of a terminal device is obtained, and the D2D capability information of the terminal device is reported to a base station, so that the base station can know a D2D capability supported by the terminal device, and correctly allocate a resource for D2D communication of the terminal device.

Figure 2:
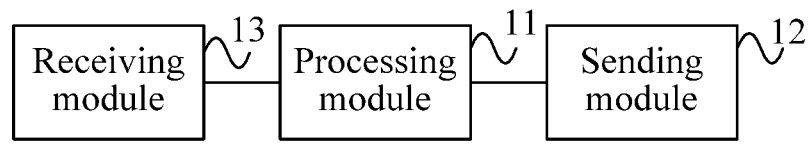
FIG. 2 is a schematic structural diagram of Embodiment 2 of an apparatus for reporting a terminal device capability according to an embodiment of the present disclosure.

FIG. 2 is a schematic structural diagram of Embodiment 2 of an apparatus for reporting a terminal device capability according to an embodiment of the present disclosure. As shown in FIG. 2, based on FIG. 1, the apparatus for reporting a terminal device capability in this embodiment further includes a receiving module 13 configured to, before the sending module 12 sends the D2D capability information of the terminal device to the base station, receive a terminal capability query message sent by the base station.

Since D2D communication is generally an emergency communications means, the base station does not need to know the D2D capability information of the terminal device in real time, and instead, needs to know the D2D capability information of the terminal device only when the terminal device needs to perform D2D communication. Therefore, the apparatus for reporting a terminal device capability that is provided in this embodiment further includes the receiving module 13 configured to receive terminal capability query information sent by the base station.

If the base station supports D2D communication of the terminal device, the base station first sends the terminal capability query message to the terminal device when knowing that the terminal device needs to perform D2D communication. The receiving module 13 in the apparatus for reporting a terminal device capability that is disposed in the terminal device receives the terminal capability query message, and then the sending module 12 sends the D2D capability information of the terminal device to the base station. The terminal capability query message is used to query capability information of the terminal device, where the capability information of the terminal device includes the D2D capability information. That is, when the base station needs to know the D2D capability information of the terminal device, the receiving module 13 receives the terminal capability query message, and then the sending module 12 sends the D2D capability information of the terminal device to the base station only in this case. Compared with periodic reporting, this method for reporting the D2D capability information can reduce a resource needed to report the D2D capability information.

Further, in this embodiment shown in FIG. 2, the terminal capability query message includes D2D capability reporting request information, and the D2D capability reporting request information is used to instruct the terminal device to report corresponding D2D capability information; and the sending module 12 is configured to send, to the base station according to the D2D capability reporting request information, the D2D capability information corresponding to the D2D capability reporting request information.

Since D2D capability information includes multiple types of information, many transmission resources are occupied if all D2D capability information of the terminal device is sent to the base station each time the receiving module 13 receives a query request message. Therefore, when requesting the terminal device to report D2D capability information, the base station may further specify that the terminal device reports D2D capability information that the base station intends to know. The terminal capability query message received by the receiving module 13 includes the D2D capability reporting request information, and the D2D capability reporting request information is used to instruct the terminal device to report corresponding D2D capability information. Then, the sending module 12 sends, to the base station according to the D2D capability reporting request information, the D2D capability information corresponding to the D2D capability reporting request information.

In addition, when sending a registration request message to the base station, the sending module 12 may further add the D2D capability information to the registration request message, or the sending module 12 may send the D2D capability information of the terminal device to the base station after the receiving module 13 receives a registration acknowledgement message sent by the base station. That is, the D2D capability information is reported to the base station in a registration process of the terminal device, and in this way, when the terminal device is registered with the base station, the base station can know the D2D capability information of the terminal device, and consequently, can correctly allocate a resource for D2D communication of the terminal device.

Figure 3:
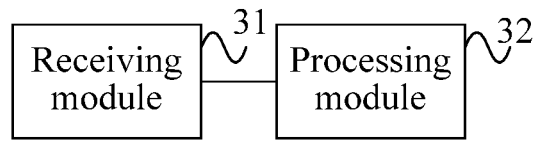
FIG. 3 is a schematic structural diagram of Embodiment 3 of an apparatus for reporting a terminal device capability according to an embodiment of the present disclosure.

FIG. 3 is a schematic structural diagram of Embodiment 3 of an apparatus for reporting a terminal device capability according to an embodiment of the present disclosure. As shown in FIG. 3, the apparatus for reporting a terminal device capability in this embodiment includes a receiving module 31 configured to receive D2D capability information of a terminal device that is sent by the terminal device; and The apparatus for reporting a terminal device capability that is provided in this embodiment is disposed in a base station on a network, and the base station supports D2D communication of the terminal device.

To correctly allocate a resource for D2D communication of the terminal device, the apparatus for reporting a terminal device capability in this embodiment needs to know the D2D capability information of the terminal device, to allocate a corresponding resource to the terminal device according to the D2D capability information of the terminal device. Therefore, the receiving module 31 is configured to receive the D2D capability information sent by the terminal device.

The D2D capability information of the terminal device includes, for example, at least one piece of D2D radio frequency capability information of the terminal device and D2D feature supporting information of the terminal device. The D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation. The D2D feature supporting information of the terminal device includes a D2D feature supported by the terminal device.

That is, the D2D capability information of the terminal device includes information of two aspects: one aspect is a D2D radio frequency capability, and the other aspect is a D2D supported-feature capability. D2D communication works over an uplink frequency band of a spectrum of a cellular network, a cell, in which the terminal device is located, of the cellular network may support multiple uplink frequency bands, and the terminal device may support D2D communication over only some uplink frequency bands. Therefore, the D2D radio frequency capability includes the information about a radio frequency band over which the terminal device supports D2D communication. In addition, the terminal device may support both D2D communication and cellular communication, and the terminal device supports both D2D communication and cellular communication over some frequency bands. Therefore, the D2D radio frequency capability includes the information about a radio frequency band over which the terminal device supports both D2D communication and cellular communication. Moreover, the terminal device may further support CA; and when the terminal device supports CA, the terminal device may use multiple downlink carriers to simultaneously receive data, and in this case, the terminal device may support D2D communication over one uplink carrier. Therefore, the D2D radio frequency capability includes the capability information that the terminal device supports both D2D communication and carrier aggregation. The D2D supported-capability information includes, for example, a D2D discovery capability, a D2D broadcast communication capability, a D2D point-to-point transmission capability, a D2D multicast communication capability, and a D2D relay communication capability.

The D2D capability information of the terminal device is determined by hardware and software configurations of the terminal device, that is, the D2D capability information is an inherent attribute of the terminal device, and the D2D capability information of the terminal device changes only after hardware or software of the terminal device is upgraded. Therefore, the terminal device may obtain the D2D capability information from preset information, or the terminal device may obtain the D2D capability information according to a hardware or software configuration. Then, the receiving module 31 may receive the D2D capability information sent by the terminal device.

A processing module 32 configured to determine a D2D capability of the terminal device according to the D2D capability information of the terminal device.

After the receiving module 31 receives the D2D capability information of the terminal device, the processing module 32 knows, according to the D2D capability information of the terminal device, a D2D capability supported by the terminal device, and further allocates a corresponding resource to the terminal device to complete D2D communication.

When the terminal device performs D2D communication, resources needed by different D2D features are different. For example, the terminal device can perform D2D communication over only some frequency bands, and the D2D capability information received by the receiving module 31 may include information about a frequency band over which D2D communication can be performed, so that the processing module 32 can know the frequency band over which the terminal device can perform D2D communication, and consequently, can allocate a resource of the corresponding frequency band to the terminal device.

The D2D capability information received by the receiving module 31 may be specific capability information, for example, the D2D discovery capability is supported, or the D2D broadcast communication capability is supported; or the receiving module 31 may receive a system version number sent by the terminal device. D2D capabilities supported by different system versions are fixed. Therefore, after knowing the system version of the terminal device, the processing module 32 can determine the D2D capability information of the terminal device.

In this embodiment, D2D capability information sent by a terminal device is received, and a D2D capability supported by the terminal device is determined, so that a resource is correctly allocated for D2D communication of the terminal device.

The receiving module 31 may periodically receive the D2D capability information of the terminal device that is sent by the terminal device, or the receiving module 31 may receive, after the apparatus for reporting a terminal device capability sends a terminal capability query message to the terminal device, the D2D capability information of the terminal device that is sent by the terminal device.

Figure 4:
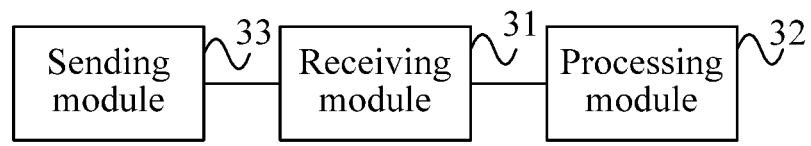
FIG. 4 is a schematic structural diagram of Embodiment 4 of an apparatus for reporting a terminal device capability according to an embodiment of the present disclosure.

FIG. 4 is a schematic structural diagram of Embodiment 4 of an apparatus for reporting a terminal device capability according to an embodiment of the present disclosure. As shown in FIG. 4, based on FIG. 3, the apparatus for reporting a terminal device capability in this embodiment further includes: a sending module 33 configured to, before the receiving module 31 receives the D2D capability information of the terminal device that is sent by the terminal device, send a terminal capability query message to the terminal device.

Since D2D communication is generally an emergency communications means, the base station does not need to know the D2D capability information of the terminal device in real time, and instead, needs to know the D2D capability information of the terminal device only when the terminal device needs to perform D2D communication. Therefore, the apparatus for reporting a terminal device capability that is provided in this embodiment further includes the sending module 33, and when the base station needs to know a D2D capability of the terminal device, the sending module 33 sends terminal capability query information to the terminal device.

If the base station supports D2D communication of the terminal device, the base station first sends the terminal capability query message to the terminal device when knowing that the terminal device needs to perform D2D communication. After the sending module 33 sends the terminal capability query message to the terminal device, the receiving module 31 receives the D2D capability information of the terminal device that is sent by the terminal device. The terminal capability query message is used to query capability information of the terminal device, where the capability information of the terminal device includes the D2D capability information. That is, only when the base station needs to know the D2D capability information of the terminal device, the sending module 33 sends the terminal capability query message to the terminal device, and then the receiving module 31 receives the D2D capability information of the terminal device that is sent by the terminal device. Compared with periodic reporting, this method for reporting the D2D capability information can reduce a resource needed to report the D2D capability information.

Further, in this embodiment shown in FIG. 4, the terminal capability query message includes D2D capability reporting request information, and the D2D capability reporting request information is used to instruct the terminal device to report corresponding D2D capability information; and the receiving module 31 is configured to receive the D2D capability information that is sent by the terminal device according to the D2D capability reporting request information, and corresponds to the D2D capability reporting request information.

Since D2D capability information includes multiple types of information, many transmission resources are occupied if the terminal device is required to report all D2D capability information each time the sending module 33 sends a query request message to the terminal device. Therefore, when requesting the terminal device to report D2D capability information, the base station may further specify that the terminal device reports D2D capability information that the base station intends to know. The terminal capability query message sent by the sending module 33 includes the D2D capability reporting request information, and the D2D capability reporting request information is used to instruct the terminal device to report corresponding D2D capability information. Then, the receiving module 31 receives the D2D capability information that is sent by the terminal device according to the D2D capability reporting request information, and corresponds to the D2D capability reporting request information.

In addition, when the terminal device sends a registration request message, the receiving module 31 may further receive the D2D capability information, where the registration request message carries the D2D capability information, or the receiving module 31 may receive, after the sending module 33 sends a registration acknowledgement message to the terminal device, the D2D capability information of the terminal device that is sent by the terminal device. That is, the D2D capability information is reported to the base station in a registration process of the terminal device, and in this way, when the terminal device is registered with the base station, the base station can know the D2D capability information of the terminal device, and consequently, can correctly allocate a resource for D2D communication of the terminal device.

Information reported to the base station when an RRC layer of the terminal device is in an RRC_connected state specifies current "information about a discovery message receiving state". The information about a discovery receiving state includes two states: starting receiving and stopping receiving.

Figure 5:
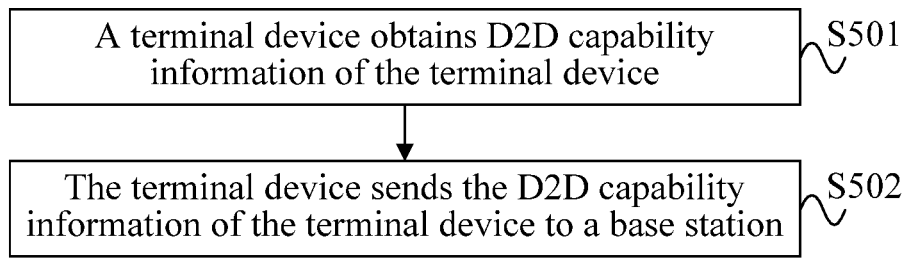
FIG. 5 is a flowchart of Embodiment 1 of a method for reporting a terminal device capability according to an embodiment of the present disclosure.

FIG. 5 is a flowchart of Embodiment 1 of a method for reporting a terminal device capability according to an embodiment of the present disclosure. As shown in FIG. 5, the method in this embodiment includes the following steps.

Step S501: A terminal device obtains D2D capability information of the terminal device.

Step S502: The terminal device sends the D2D capability information of the terminal device to a base station.

The method for reporting a terminal device capability in this embodiment is used to perform processing of the apparatus for reporting a terminal device capability that is shown in FIG. 1, and the implementation principles and technical effects thereof are similar and are not described herein again.

Further, in the embodiment shown in FIG. 5, the D2D capability information of the terminal device includes at least one piece of D2D radio frequency capability information of the terminal device and D2D feature supporting information of the terminal device.

Further, in the embodiment shown in FIG. 5, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

Figure 6:
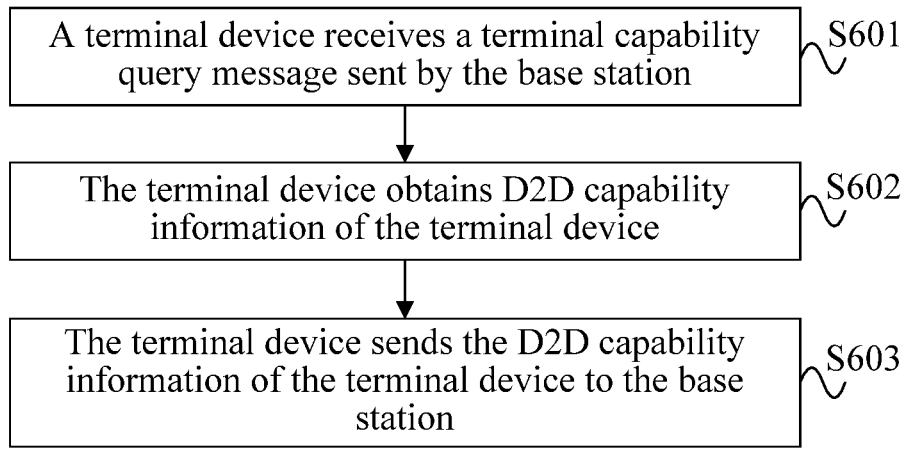
FIG. 6 is a flowchart of Embodiment 2 of a method for reporting a terminal device capability according to an embodiment of the present disclosure.

FIG. 6 is a flowchart of Embodiment 2 of a method for reporting a terminal device capability according to an embodiment of the present disclosure. As shown in FIG. 6, the method in this embodiment includes the following steps.

Step S601: A terminal device receives a terminal capability query message sent by a base station.

Step S602: The terminal device obtains D2D capability information of the terminal device.

Step S603: The terminal device sends the D2D capability information of the terminal device to the base station.

Further, in this embodiment shown in FIG. 6, the terminal capability query message includes D2D capability reporting request information, and the D2D capability reporting request information is used to instruct the terminal device to report corresponding D2D capability information; and step S603 includes sending, by the terminal device to the base station according to the D2D capability reporting request information, the D2D capability information corresponding to the D2D capability reporting request information.

Further, step S502 in the embodiment shown in FIG. 5 or step S603 in the embodiment shown in FIG. 6 includes periodically sending, by the terminal device, the D2D capability information of the terminal device to the base station.

Further, step S502 in the embodiment shown in FIG. 5 or step S603 in the embodiment shown in FIG. 6 includes sending, by the terminal device, a registration request message to the base station, where the registration request message includes the D2D capability information of the terminal device; or sending, by the terminal device, the D2D capability information of the terminal device to the base station after the terminal device receives a registration acknowledgement message sent by the base station.

Figure 7:
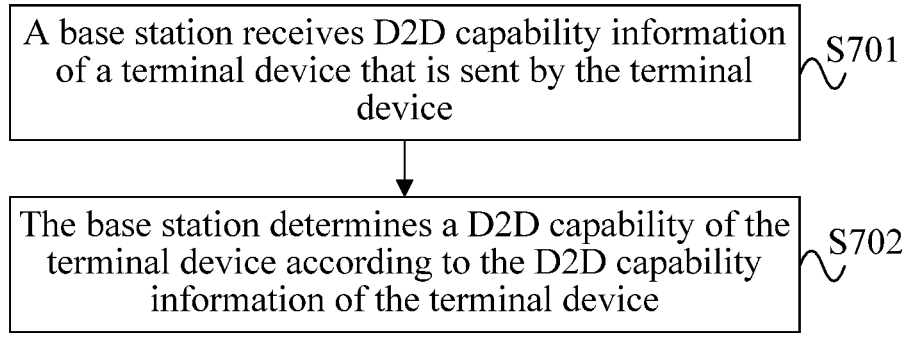
FIG. 7 is a flowchart of Embodiment 3 of a method for reporting a terminal device capability according to an embodiment of the present disclosure.

FIG. 7 is a flowchart of Embodiment 3 of a method for reporting a terminal device capability according to an embodiment of the present disclosure. As shown in FIG. 7, the method in this embodiment includes the following steps.

Step S701: A base station receives D2D capability information of a terminal device that is sent by the terminal device.

Step S702: The base station determines a D2D capability of the terminal device according to the D2D capability information of the terminal device.

The method for reporting a terminal device capability in this embodiment is used to perform processing of the apparatus for reporting a terminal device capability that is shown in FIG. 3, and the implementation principles and technical effects thereof are similar and are not described herein again.

Further, in the embodiment shown in FIG. 7, the D2D capability information of the terminal device includes at least one piece of D2D radio frequency capability information of the terminal device and D2D feature supporting information of the terminal device.

Further, in the embodiment shown in FIG. 7, the D2D radio frequency capability information of the terminal device includes at least one piece of the following information: information about a radio frequency band over which the terminal device supports D2D communication, information about a radio frequency band over which the terminal device supports both D2D communication and cellular communication, and capability information that the terminal device supports both D2D communication and carrier aggregation.

Figure 8:
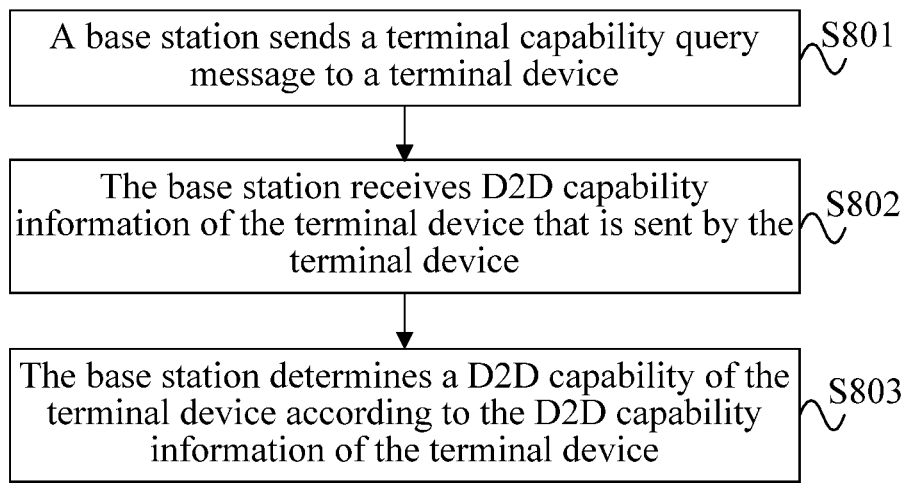
FIG. 8 is a flowchart of Embodiment 4 of a method for reporting a terminal device capability according to an embodiment of the present disclosure.

FIG. 8 is a flowchart of Embodiment 4 of a method for reporting a terminal device capability according to an embodiment of the present disclosure. As shown in FIG. 8, the method in this embodiment includes the following steps.

Step S801: A base station sends a terminal capability query message to a terminal device.

Step S802: The base station receives D2D capability information of the terminal device that is sent by the terminal device.

Step S803: The base station determines a D2D capability of the terminal device according to the D2D capability information of the terminal device.

Further, in this embodiment shown in FIG. 8, the terminal capability query message includes D2D capability reporting request information, and the D2D capability reporting request information is used to instruct the terminal device to report corresponding D2D capability information; and step S802 includes receiving, by the base station, the D2D capability information that is sent by the terminal device according to the D2D capability reporting request information, and corresponds to the D2D capability reporting request information.

Further, step S701 in the embodiment shown in FIG. 7 or step S802 in the embodiment shown in FIG. 8 includes receiving, by the base station, the D2D capability information of the terminal device that is periodically sent by the terminal device.

Further, step S701 in the embodiment shown in FIG. 7 or step S802 in the embodiment shown in FIG. 8 includes receiving, by the base station, a registration request message sent by the terminal device, where the registration request message includes the D2D capability information of the terminal device; or receiving, by the base station, the D2D capability information of the terminal device that is sent by the terminal device after the terminal device receives a registration acknowledgement message.

Specific content of D2D capability information is used as an example below to further describe the methods and apparatuses for reporting a terminal device capability that are provided in the foregoing embodiments.

Assuming that a terminal device receives a terminal capability query message sent by a base station, and the message requests querying radio frequency capability information of the terminal device, when the terminal device supports D2D communication over a frequency band, information reported by the terminal device to the base station may be as follows:

```
SupportedBandEUTRA-r12 ::=      SEQUENCE {
  bandEUTRA                       FreqBandIndicator,
```

-continued

```
halfDuplex              BOOLEAN
ULreception             BOOLEAN
```

SupportedBandEUTRA-r12 indicates that a version number of the frequency band supported by the terminal device is EUTRA-r12; FreqBandIndicator is an indicator of the frequency band, and indicates which frequency band the information is about; halfDuplex indicates a half-duplex work state; and ULreception indicates that receiving can be performed over an uplink frequency band. In cellular communication, an uplink frequency band is only used to transmit a signal, but in D2D communication, an uplink frequency band may be used to receive a signal; therefore, after the terminal device sends the foregoing information to the base station, the base station can know that the terminal device supports D2D communication over a frequency band.

Alternatively, when the terminal device supports D2D communication over a frequency band, information reported by the terminal device to the base station may be further as follows:

```
ULBandInfoEUTRA ::=         SEQUENCE {
ULBandList                  ULBandList      OPTIONAL
}
ULBandList ::=              SEQUENCE (SIZE (1..maxBandsxx)) OF
ULBandInfo
ULBandInfo::=               SEQUENCE {
SupportD2DReception         BOOLEAN
}
```

ULBandList indicates a list of frequency bands that support uplink transmission, and SupportD2DReception indicates that the uplink frequency bands support D2D receiving.

When the terminal device supports both cellular communication and D2D communication over a frequency band, information reported by the terminal device to the base station may be as follows:

```
BandParameters-r12 ::= SEQUENCE {
bandEUTRA-r10           FreqBandIndicator,
bandParametersUL-r10    BandParametersUL-r10    OPTIONAL,
bandParametersDL-r10    BandParametersDL-r10,   OPTIONAL
  ULreception                                   BOOLEAN
  DL&ULreception                                BOOLEAN
}
CellularD2DcombinationParameters:: SEQUENCE {(SIZE
(1..maxSimultaneousBands-r10)) OF BandParameters
```

ULreception indicates that receiving can be performed over an uplink frequency band, and DL&ULreception indicates that receiving can be both performed over an uplink frequency band and a downlink frequency band. CellularD2DcombinationParameters is a combined parameter of cellular communication and D2D communication. After knowing that the terminal device can both perform, over a frequency band, receiving over an uplink frequency band and a downlink frequency band, and obtaining CellularD2DcombinationParameters, the base station can determine that the terminal device can perform both cellular communication and D2D communication over the frequency band.

When the terminal device also supports D2D communication while having a CA capability, the terminal device also reports CellularD2DcombinationParameters while reporting the CA capability to the base station, and the base station can determine that the terminal device supports both CA and D2D communication. If the terminal device does not report CellularD2DcombinationParameters, and instead, reports only SupportedBandEUTRA-r12 or ULBandInfoEUTRA while reporting the CA capability to the base station, the base station determines that the terminal device supports CA or D2D communication, but does not support both.

It should be noted that the processing module 11 in the embodiments of the present disclosure may correspond to a processor of the terminal device, and the processor herein may be a central processing unit (CPU), or an application specific integrated circuit (ASIC), or one or more integrated circuits for implementing the embodiments of the present disclosure. The sending module 12 may correspond to a transmitter of the terminal device, or may correspond to a transceiver of the terminal device. The receiving module 13 may correspond to a receiver of the terminal device, or may correspond to a transceiver of the terminal device. The terminal device may further include a memory, the memory is configured to store instruction code, and the processor invokes the instruction code of the memory, to control the sending module 12 and the receiving module 13 in the embodiments of the present disclosure to perform the foregoing operations.

The receiving module 31 in the embodiments of the present disclosure may correspond to a receiver of the base station, or may correspond to a transceiver of the base station. The processing module 32 may correspond to a processor of the base station, and the processor herein may be a CPU, or an ASIC, or one or more integrated circuits for implementing the embodiments of the present disclosure. The sending module 33 may correspond to a transmitter of the base station, or may correspond to a transceiver of the base station. The base station may further include a memory, the memory is configured to store instruction code, and the processor invokes the instruction code of the memory, to control the receiving module 31 and the sending module 33 in the embodiments of the present disclosure to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. An apparatus for reporting a terminal device capability, comprising:
   a processor configured to obtain device to device (D2D) capability information of a terminal device, wherein the D2D capability information of the terminal device comprises D2D radio frequency capability information of the terminal device, and wherein the D2D radio frequency capability information of the terminal device comprises at least one piece of information about a radio frequency band over which the terminal device supports D2D communication, information about a radio frequency band over which the terminal device supports both D2D communication and cellular communication, or capability information that the terminal device supports both D2D communication and carrier aggregation; and a transmitter coupled to the processor and configured to send the D2D capability information of the terminal device to a base station.

2. The apparatus for reporting a terminal device capability according to claim 1, wherein the D2D capability information of the terminal device further comprises D2D feature supporting information of the terminal device.

3. An apparatus for reporting a terminal device capability, comprising:

a receiver configured to receive device to device (D2D) capability information of a terminal device that is sent by the terminal device, wherein the D2D capability information of the terminal device comprises D2D radio frequency capability information of the terminal device, and wherein the D2D radio frequency capability information of the terminal device comprises at least one piece of information about a radio frequency band over which the terminal device supports D2D communication, information about a radio frequency band over which the terminal device supports both D2D communication and cellular communication, or capability information that the terminal device supports both D2D communication and carrier aggregation; and a processor coupled to the receiver and configured to determine a D2D capability of the terminal device according to the D2D capability information of the terminal device.

4. The apparatus for reporting a terminal device capability according to claim 3, wherein the D2D capability information of the terminal device further comprises D2D feature supporting information of the terminal device.

5. A method for reporting a terminal device capability, comprising:

obtaining, by a terminal device, device to device (D2D) capability information of the terminal device, wherein the D2D capability information of the terminal device comprises D2D radio frequency capability information of the terminal device, and wherein the D2D radio frequency capability information of the terminal device comprises at least one piece of information about a radio frequency band over which the terminal device supports D2D communication, information about a radio frequency band over which the terminal device supports both D2D communication and cellular communication, or capability information that the terminal device supports both D2D communication and carrier aggregation; and sending, by the terminal device, the D2D capability information of the terminal device to a base station.

6. The method according to claim 5, wherein the D2D capability information of the terminal device further comprises D2D feature supporting information of the terminal device.

7. A method for reporting a terminal device capability, comprising:

receiving, by a base station, device to device (D2D) capability information of a terminal device that is sent by the terminal device, wherein the D2D capability information of the terminal device comprises D2D radio frequency capability information of the terminal device, and wherein the D2D radio frequency capability information of the terminal device comprises at least one piece of information about a radio frequency band over which the terminal device supports D2D communication, information about a radio frequency band over which the terminal device supports both D2D communication and cellular communication, or capability information that the terminal device supports both D2D communication and carrier aggregation; and determining, by the base station, a D2D capability of the terminal device according to the D2D capability information of the terminal device.

8. The method according to claim 7, wherein the D2D capability information of the terminal device further comprises D2D feature supporting information of the terminal device.

* * * * *